(12) United States Patent
Zhang

(10) Patent No.: US 8,981,676 B2
(45) Date of Patent: Mar. 17, 2015

(54) LED BACKLIGHT DRIVING CIRCUIT, LCD DEVICE, AND METHOD FOR DRIVING THE LED BACKLIGHT DRIVING CIRCUIT

(71) Applicant: Shenzhen China Star Optoelectronics Technology Co., Ltd., Shenzhen (CN)

(72) Inventor: Hua Zhang, Shenzhen (CN)

( * ) Notice: Subject to any disclaimer, the term of this patent is extended or adjusted under 35 U.S.C. 154(b) by 74 days.

(21) Appl. No.: 14/006,323

(22) PCT Filed: Jun. 28, 2013

(86) PCT No.: PCT/CN2013/078251
§ 371 (c)(1),
(2) Date: Sep. 20, 2013

(87) PCT Pub. No.: WO2014/190580
PCT Pub. Date: Dec. 4, 2014

(65) Prior Publication Data
US 2014/0354181 A1      Dec. 4, 2014

(30) Foreign Application Priority Data
May 28, 2013   (CN) .......................... 2013 1 0203881

(51) Int. Cl.
H05B 33/08       (2006.01)
H04N 13/04       (2006.01)
G09G 3/34        (2006.01)

(52) U.S. Cl.
CPC .......... *G09G 3/3406* (2013.01); *H05B 33/0845* (2013.01); *H05B 33/0815* (2013.01); *H05B 33/0827* (2013.01); *H04N 13/0454* (2013.01)
USPC ....................................................... 315/307

(58) Field of Classification Search
CPC ........... H05B 33/0815; H05B 33/0845; H05B 33/0827; H04N 13/0454
See application file for complete search history.

(56) References Cited

U.S. PATENT DOCUMENTS

| | | | |
|---|---|---|---|
| 2010/0045784 A1* | 2/2010 | Okazaki et al. | 348/55 |
| 2011/0285712 A1* | 11/2011 | Arai et al. | 345/426 |
| 2012/0206441 A1 | 8/2012 | Liu et al. | |
| 2012/0320023 A1 | 12/2012 | Tsai et al. | |
| 2013/0021326 A1 | 1/2013 | Tsai et al. | |
| 2014/0092071 A1* | 4/2014 | Yang | 345/211 |
| 2014/0340296 A1* | 11/2014 | Zhang | 345/102 |

FOREIGN PATENT DOCUMENTS

| | | |
|---|---|---|
| CN | 101123734 A | 2/2008 |
| CN | 101630493 A | 1/2010 |
| CN | 101944331 A | 1/2011 |

(Continued)

OTHER PUBLICATIONS

Xi Wanhua, the International Searching Authority written comments, Mar. 2014, CN.

*Primary Examiner* — Jany Richardson

(57) ABSTRACT

A light emitting diode (LED) backlight driving circuit includes an LED light bar, a power supply that drives the LED light bar, and a control assembly that controls the LED light bar and the power supply. The control assembly is configured with a monitor that reduces brightness of the LED light bar when a display image of a liquid crystal (LC) panel is switched between a two-dimensional (2D) display mode of the LC panel and a three-dimensional (3D) display mode of the LC panel, and the brightness of the LED light bar goes normal after a preset delay time.

17 Claims, 4 Drawing Sheets

(56) References Cited

FOREIGN PATENT DOCUMENTS

| | | |
|---|---|---|
| CN | 102291874 A | 12/2011 |
| CN | 102450027 A | 5/2012 |
| CN | 102572476 A | 7/2012 |
| CN | 102665325 A | 9/2012 |
| CN | 102708805 A | 10/2012 |
| CN | 102740567 A | 10/2012 |
| CN | 102750920 A | 10/2012 |
| CN | 202549254 U | 11/2012 |
| CN | 102918860 A | 2/2013 |
| CN | 102970500 A | 3/2013 |
| EP | 2312570 A1 | 4/2011 |

* cited by examiner

LED BACKLIGHT DRIVING CIRCUIT, LCD DEVICE, AND METHOD FOR DRIVING THE LED BACKLIGHT DRIVING CIRCUIT

TECHNICAL FIELD

The present disclosure relates to the field of liquid crystal displays (LCDs), and more particularly to a light emitting diode (LED) backlight driving circuit, an LCD device, and a method for driving the LED backlight driving circuit.

BACKGROUND

A liquid crystal display (LCD) device includes a liquid crystal (LC) panel and a backlight unit, where the backlight unit includes a light emitting diode (LED) backlight driving circuit. As shown in FIG. 1, the LED backlight driving circuit includes a power supply 100, an LED light bar 300 coupled to the power supply 100, and a constant current driving chip 200 that controls the power supply 100. When an enable signal is at a high level (logic 1), the constant current driving chip 200 normally works, the LED light bar 300 lights and provides a light source for the LC panel, thus an image of the LC panel is clear. For an LCD device capable of switching a display image of the LC panel between a two-dimensional (2D) display mode of the LC panel and a three-dimensional (3D) display mode of the LC panel, because deflection of liquid crystal molecules needs time, the LC panel abnormally displays for a short time when the display image is switched between the 2D display mode and the 3D display mode.

SUMMARY

In view of the above-described problems, the aim of the present disclosure is to provide a light emitting diode (LED) backlight driving circuit, a liquid crystal display (LCD) device, and a method for driving the LED backlight driving circuit capable of avoiding abnormal display of a liquid crystal (LC) panel when a display image of the LC panel is switched between a two-dimensional (2D) display mode of the LC panel and a three-dimensional (3D) display mode of the LC panel.

The aim of the present disclosure is achieved by the following methods:

A light emitting diode (LED) backlight driving circuit comprises an LED light bar, a power supply that drives the LED light bar, and a control assembly that controls the LED light bar and the power supply. The control assembly is configured with a monitor that reduces brightness of the LED light bar when a display image of a liquid crystal (LC) panel is switched between a two-dimensional (2D) display mode of the LC panel and a three-dimensional (3D) display mode of the LC panel, and the LED light bar goes normal after a preset delay time.

Furthermore, the control assembly comprises a constant current driving chip. The constant current driving chip comprises a main-control unit that controls the power supply, and the main-control unit comprises an enable control pin that controls the power supply to turn on/off. A signal turning off the constant current driving chip is sent to the enable control pin by the monitor when the display image is switched between the 2D display mode and the 3D display mode. This is a method of directly controlling the power supply to turn off, and the method uses the enable control pin of the constant current driving chip to turn off the LED light bar when the display image is switched between the 2D display mode and the 3D display mode, namely an image of the LC panel is black when the display image is switched between the 2D display mode and the 3D display mode, which avoids the abnormal display of the LC panel.

Furthermore, the monitor comprises a first controllable switch and a first controller that controls the first controllable switch. The first controllable switch is connected in series between the enable control pin and a ground terminal of the LED backlight driving circuit. The first controller controls the first controllable switch to turn on when the display image is switched between the 2D display mode and the 3D display mode. When the enable control pin is at a high level, the constant current driving chip drives the power supply to normally work. When the enable control pin is at a low level, the constant current driving chip drives the power supply to turn off. When the display image is switched between the 2D display mode and the 3D display mode, the enable control pin is connected with the ground terminal of the LED backlight driving circuit through the first controllable switch, thus voltage of the enable control pin is forcedly reduced, and the power supply is driven to turn off. The method is easy to operate, and improves control reliability because the enable control pin is connected with the ground terminal of the LED backlight driving circuit through the first controllable switch.

Furthermore, the monitor comprises a first controllable switch, a first comparator, and a first controller. A first input end of the first comparator receives a first reference voltage, and a second input end of the first comparator is coupled to the first controller. The first controller controls the first comparator to drive the first controllable switch to turn on when the display image is switched between the 2D display mode and the 3D display mode. The first comparator is used in the method, as long as a driving voltage of the first controller reaches a threshold value, logic of the first comparator changes. Thus, even if a control signal of the first controller is disturbed, action logic of the first controllable unit is not directly affected, which improves reliability.

Furthermore, the control assembly comprises a constant current driving chip. The constant current driving chip comprises a detection unit, an input end of the detection unit is coupled to a cathode of the LED light bar. The monitor comprises a load unit, a resistance value of the load unit is adjustable, and the load unit is connected in series between an output end of the detection unit and a ground terminal of the LED backlight driving circuit. The monitor controls the resistance value of the load unit to increase when the display image is switched between the 2D display mode and the 3D display mode. This is a method of reducing the brightness of the LED light bar but not turning off the LED light bar. The load unit is connected in series with the LED light bar. According to voltage-resistor principles, when a total voltage is constant, the resistance value of the load unit increases, and voltage of two ends of the LED light bar accordingly reduces, namely the brightness of the LED light bar reduces. When the display image is switched between the 2D display mode and the 3D display mode, the monitor controls the resistance value of the load unit to increase, and the brightness of the LED light bar accordingly reduces, which avoids users seeing the abnormal display of the LC panel.

Furthermore, the load unit comprises a first resistor and a second resistor that are connected in series with each other. Two ends of the second resistor are connected with a second controllable switch, and the second resistor is connected with the second controllable switch in parallel. The monitor further comprises a second controller, and the second controller controls the second controllable switch to turn off when the display image is switched between the 2D display mode and the 3D display mode. When the second controllable switch turns on, the current flowing through the first resistor and the second controllable switch flows to the ground terminal of the LED backlight driving circuit without flowing through the second resistor. At this time, the resistance value of the load unit is equal to a resistance value of the first resistor. The monitor controls the second controllable switch to turn off when the display image is switched between the 2D display mode and the 3D display mode, the resistance value of the load unit is equal to a sum of the resistance value of the first resistor and the resistance value of the second resistor. Namely when the display image is switched between the 2D display mode and the 3D display mode, the resistance value of the load unit increases, which reduces the brightness of the LED unit bar. Thus, the users do not easily perceive the abnormal display of the LC panel when the display image is switched between the 2D display mode and the 3D display mode.

Furthermore, the load unit comprises a first resistor and a second resistor that are connected in series with each other. Two ends of the second resistor are connected with a second controllable switch, and the second resistor is connected with the second controllable switch in parallel. The monitor further comprises a second controller and a second comparator, where a first input end of the second comparator receives a second reference voltage, and a second input end of the second comparator is coupled to the second controller. The second controller controls the second comparator to drive the second controllable switch to turn off when the display image is switched between the 2D display mode and the 3D display mode. The method uses the second comparator, as long as a driving voltage of the second controller reaches a threshold value, logic of the second comparator changes. Thus, even if a control signal of the second controller is disturbed, action logic of the second controllable unit is not directly affected, which improves reliability.

Furthermore, the control assembly comprises a constant current driving chip. The constant current driving chip comprises a detection unit and a main-control unit that controls the power supply, and the main-control unit comprises an enable control pin that controls the power supply to turn on/off.

The monitor comprises a load unit, a first controllable switch, a second controllable switch, a first comparator, a second comparator, and a controller, where the first controllable switch is connected in series between the enable control pin and a ground terminal of the LED backlight driving circuit.

A first input end of the first comparator receives a reference voltage, and a second input end of the first comparator is coupled to the controller. The load unit is connected in series between an output end of the detection unit and the ground terminal of the LED backlight driving circuit. An input end of the detection unit is coupled to a cathode of the LED light bar. A first input end of the second comparator receives the reference voltage, and a second input end of the second comparator is coupled to the controller. The load unit comprises a first resistor and a second resistor that are connected in series with each other. Two ends of the second resistor are connected with the second controllable switch, and the second resistor is connected with the second controllable switch in parallel. When the display image is switched between the 2D display mode and the 3D display mode, the controller controls the first comparator to drive the first controllable switch to turn on, or the controller controls the second comparator to drive the second controllable switch to turn off.

When the display image is switched between the 2D display mode and the 3D display mode, the method may choose to reduce the brightness of the LED light bar or choose to turn off the LED light bar.

The method uses the first comparator and the second comparator, as long as a driving voltage of the controller reaches the threshold value, logic of the first comparator or the second comparator changes. Thus, even if a control signal of the controller is disturbed, the action logic of the first controllable unit or the second controllable unit is not directly affected, which improves reliability.

A light crystal display (LCD) device comprises the above-mentioned LED backlight driving circuit.

A method for driving a light emitting diode (LED) backlight diving circuit comprises:

A: detecting input signals of a two-dimensional (2D) display mode of a liquid crystal (LC) panel and a three-dimensional (3D) display mode of the LC panel; and B: reducing brightness of an LED light bar when a display image of the LC panel is switched between the 2D display mode and the 3D display mode, and changing the brightness of the LED light bar to be normal after a preset delay time.

The present disclosure uses the monitor, where the monitor reduces the brightness of the LED light bar when the display image is switched between the 2D display mode and the 3D display mode. Because the LC panel itself does not light, the backlight unit is used for providing light source for the LC panel. Even if the LC panel abnormally display when the display image is switched between the 2D display mode and the 3D display mode, as long as the brightness of the LED light bar of the backlight unit reduces or the LED light bar of the backlight unit is off when the display image is switched between the 2D display mode and the 3D display mode, users do not easily perceive abnormal display of the LC panel when the display image is switched between the 2D display mode and the 3D display mode. Because of a short time difference to switch between the 2D display mode and the 3D display mode, temporary brightness reduction of the LED light bar of the backlight unit or temporary black image of the LC panel hardly affects users' visual sense, and even can be ignore. Additionally, the LC panel comprises a plurality of display pixels, where each of the display pixels is controlled by a single driving voltage. If the abnormal display of the LC panel at the time of switching between the 2D display mode and the 3D display mode is corrected, the driving voltage corresponding to each of the display pixels needs to be adjusted, which increases costs and design difficulty. The present disclosure controls the brightness of the LC panel instead of using a complicated driving circuit, which simplifies design and reduces cost of development.

Figure 1:
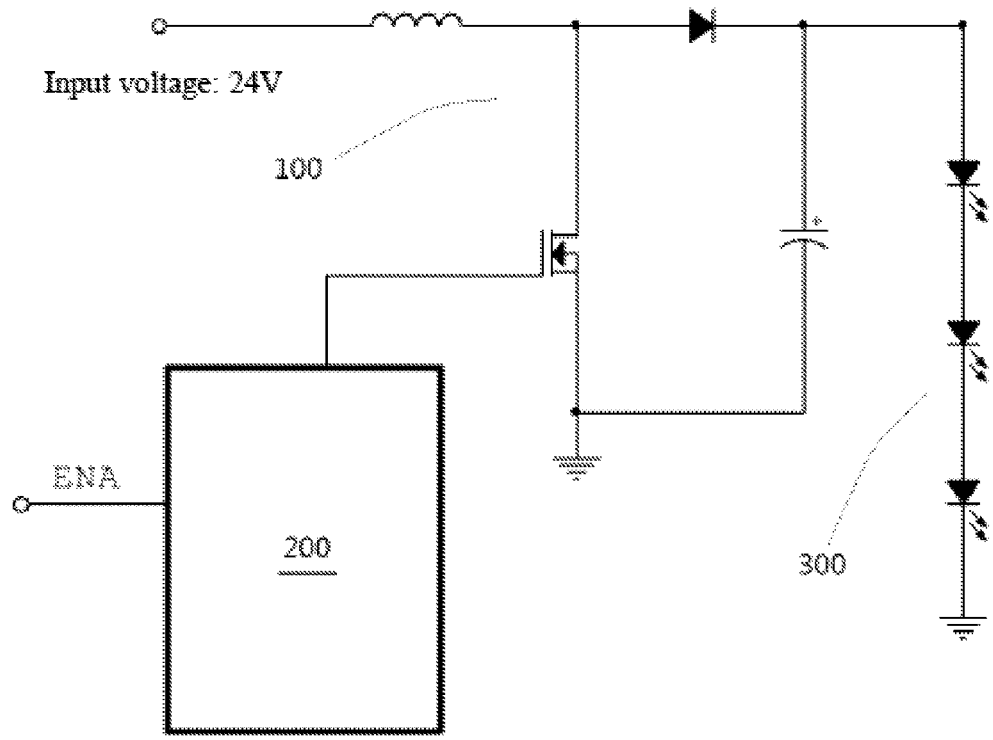
FIG. 1 is a schematic diagram of a typical light emitting diode (LED) backlight driving circuit.

Wherein: 100. Power supply; 200. Control assembly; 210. Constant current driving chip; 211. Main-control unit; 212. Enable control pin; 213. Detection unit; 220. Monitor; 230. Controller; 231. First controller; 232. Second controller; 240. Load unit; 300. LED light bar; R1. First resistor; R2. Second resistor; Q1. First controllable switch; Q2. Second controllable switch; OP1. First comparator; OP2. Second comparator; VF. Reference voltage; VF1. First reference voltage; VF2. Second reference voltage.

DETAILED DESCRIPTION

The present disclosure provides a liquid crystal display (LCD) device comprising a liquid crystal (LC) panel and a backlight unit. The backlight unit comprises a light emitting diode (LED) backlight driving circuit. The LED backlight driving circuit comprises an LED light bar, a power supply that drives the LED light bar, and a control assembly that controls the LED light bar and the power supply. The control assembly is configured with a monitor, where monitor is used for reducing brightness of the LED light bar when a display image of the LC panel is switched between a two-dimensional (2D) display mode of the LC panel and a three-dimensional (3D) display mode of the LC panel, and brightness of the LED light bar goes normal after a preset delay time.

The present disclosure uses the monitor, where the monitor reduces the brightness of the LED light bar when the display image is switched between the 2D display mode and the 3D display mode. Because the LC panel itself does not light, the backlight unit is used to provide a light source for the LC panel. Even if the LC panel abnormally displays when the display image is switched between the 2D display mode and the 3D display mode, as long as the brightness of the LED light bar of the backlight unit reduces or the LED light bar of the backlight unit is off when the display image is switched between the 2D display mode and the 3D display mode, users do not easily perceive abnormal display of the LC panel when the display image is switched between the 2D display mode and the 3D display mode. Because of a short time difference to switch between the 2D display mode and the 3D display mode, temporary brightness reduction of the LED light bar of the backlight unit or temporary black image of the LC panel hardly affects users' visual sense, and even can be ignored. Additionally, the LC panel comprises a plurality of display pixels, where each of the display pixels is controlled by a single driving voltage. If the abnormal display of the LC panel at the time of switching between the 2D display mode and the 3D display mode is corrected, the driving voltage corresponding to each of the display pixels needs to be adjusted, which increases costs and design difficulty. The present disclosure controls the brightness of the LC panel instead of using a complicated driving circuit, which simplifies design and reduces cost of development.

The present disclosure is further described in detail in accordance with the figures and the exemplary examples.

EXAMPLE 1

Figure 2:
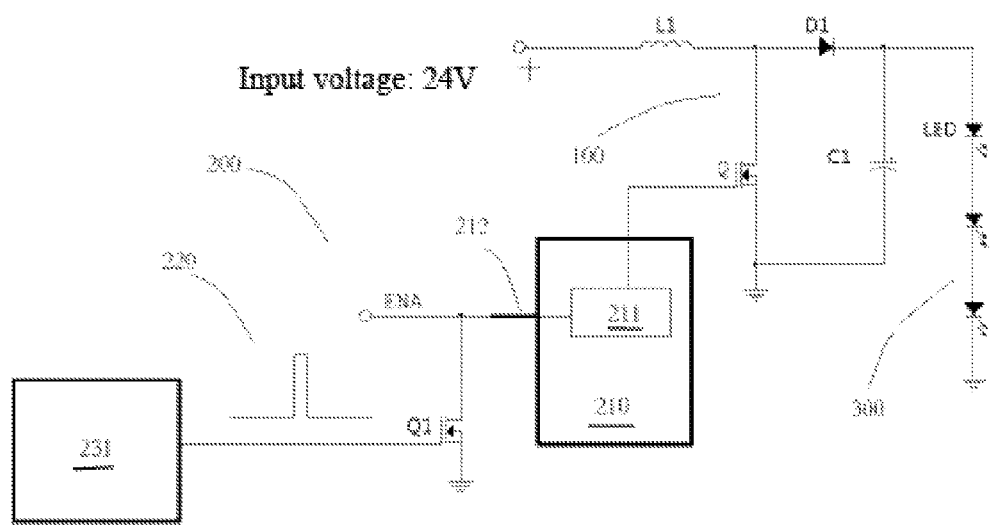
FIG. 2 is a schematic diagram of an LED backlight driving circuit of a first example of the present disclosure.

As shown in FIG. 2, the LED backlight driving circuit of a first example comprises the LED light bar 300, the power supply 100 that drives the LED light bar 300, and the control assembly 200 that controls the LED light bar 300 and the power supply 100. The control assembly 200 is configured with the monitor 220, where the monitor 220 is used for reducing the brightness of the LED light bar 300 when the display image is switched between the 2D display mode the 3D display mode, and the brightness of the LED light bar 300 goes normal after the preset delay time.

The control assembly 200 comprises a constant current driving chip 210, where the constant current driving chip 210 comprises a main-control unit 211 that controls the power supply 100. The main-control unit 211 comprises an enable control pin 212 that controls the power supply 100 to turn on/off.

The monitor 220 comprises a first controllable switch Q1 and a first controller 231 that controls the first controllable switch Q1. The first controllable switch Q1 is connected in series between the enable control pin 212 and a ground terminal of the LED backlight driving circuit. The first controller 231 controls the first controllable switch Q1 to turn on when the display image is switched between the 2D display mode and the 3D display mode.

The first example directly controls the power supply 100 to turn off, and uses the enable control pin 212 of the constant current driving chip 210 to turn off the LED light bar 300 when the display image is switched between the 2D display mode and the 3D display mode, namely an image of the LC panel is black when the display image is switched between the 2D display mode and the 3D display mode, which avoids the abnormal display of the LC panel. When the enable control pin 212 is at a high level (logic 1), the constant current driving chip 210 drives the power supply 100 to normally work. When the enable control pin 212 is at a low level (logic 0), the constant current driving chip 210 drives the power supply 100 to turn off. When the display image is switched between the 2D display mode and the 3D display mode, the enable control pin 212 is connected with the ground terminal of the LED backlight driving circuit through the first controllable switch Q1, thus voltage of the enable control pin 212 is forcedly reduced, and the power supply 100 is driven to turn off. The first example is easy to operate, and improves control reliability because the enable control pin 212 is connected with the ground terminal of the LED backlight driving circuit through the first controllable switch Q1.

EXAMPLE 2

Figure 3:
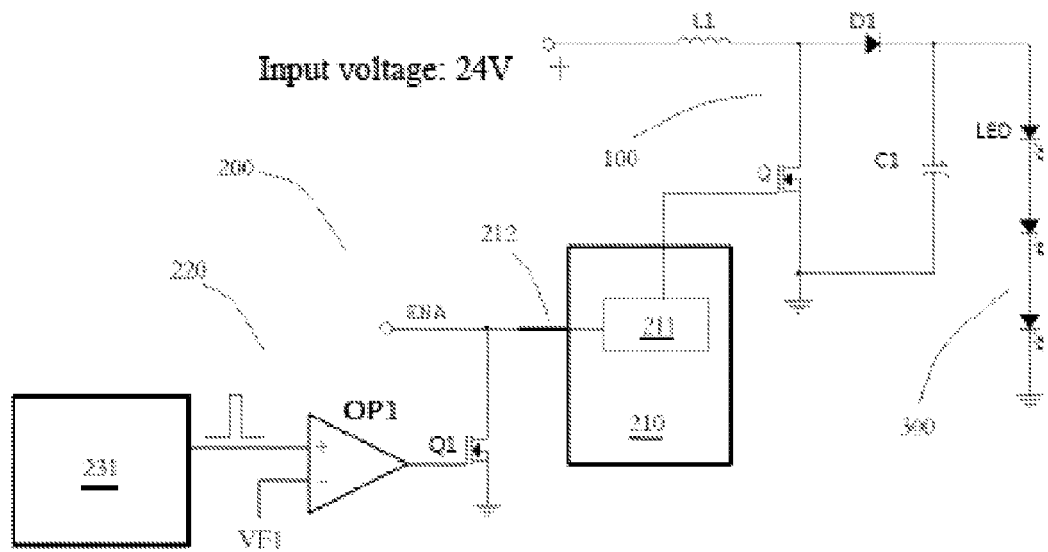
FIG. 3 is a schematic diagram of an LED backlight driving circuit of a second example of the present disclosure.

As shown in FIG. 3, the LED backlight driving circuit of a second example comprises the LED light bar 300, the power supply 100 that drives the LED light bar 300, and the control assembly 200 that controls the LED light bar 300 and the power supply 100. The control assembly 200 is configured with the monitor 220, where the monitor 220 is used for reducing the brightness of the LED light bar 300 when the display image is switched between the 2D display mode and the 3D display mode, and the brightness of the LED light bar 300 goes normal after the preset delay time.

The control assembly 200 comprises the constant current driving chip 210, where the constant current driving chip 210 comprises the main-control unit 211 that controls the power supply 100. The main-control unit 211 comprises the enable control pin 212 that controls the power supply 100 to turn on/off. The monitor 220 comprises the first controllable switch Q1, a first comparator OP1, and the first controller 231. A first input end of the first comparator OP1 receives a first reference voltage VF1, and a second input end of the first comparator OP1 is coupled to the first controller 231. The first controller 231 controls the first comparator OP1 to drive the first controllable switch Q1 to turn on when the display image is switched between the 2D display mode and the 3D display mode.

The second example uses another method to directly controls the power supply 100 to turn off, and uses the enable control pin 212 of the constant current driving chip 210 to turn off the LED light bar 300 when the display image is switched between the 2D display mode and the 3D display mode, namely the image of the LC panel is black when the display image is switched between the 2D display mode and the 3D display mode, which avoids the abnormal display of the LC panel. As long as a driving voltage of the first controller 231 reaches a threshold value, logic of the first comparator OP1 changes. Thus, even if a control signal of the first controller 231 is disturbed, action logic of the first controllable unit is not directly affected, which improves reliability.

EXAMPLE 3

Figure 4:
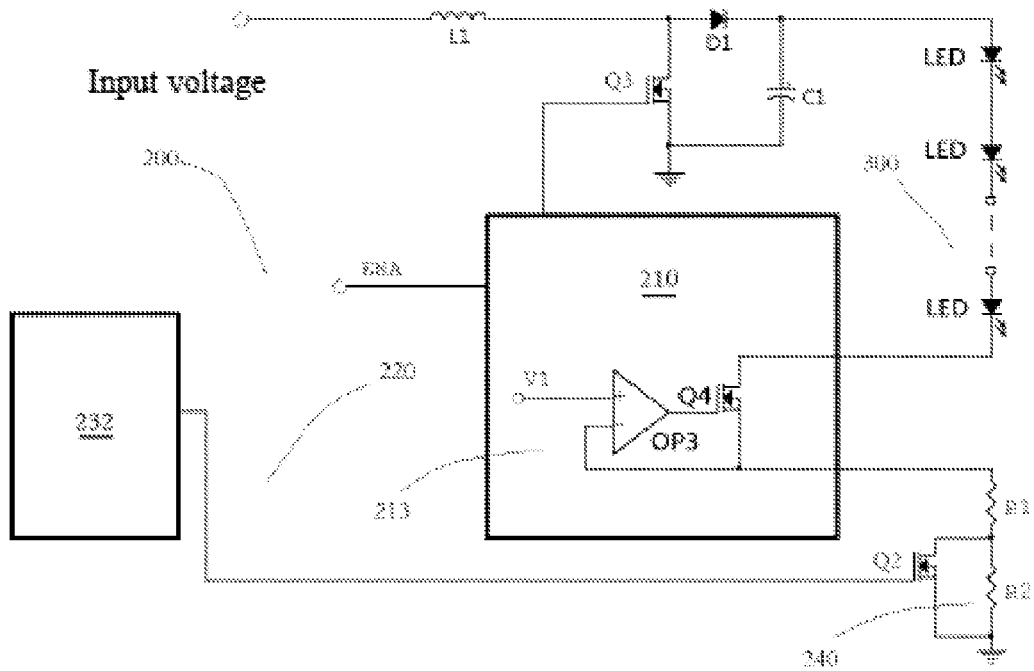
FIG. 4 is a schematic diagram of an LED backlight driving circuit of a third example of the present disclosure.
Figure 5:
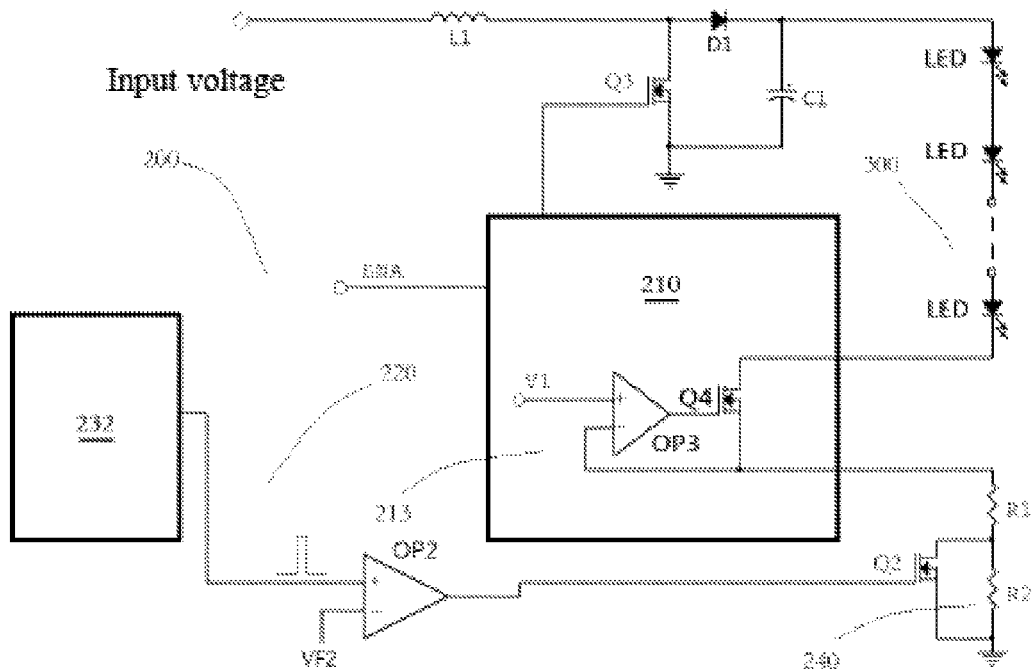
FIG. 5 is a schematic diagram of an LED backlight driving circuit of a fourth example of the present disclosure.

As shown in FIG. 4, the control assembly 200 of a third example comprises the constant current driving chip 210 comprising a detection unit 213. An input end of the detection unit 213 is coupled to a cathode of the LED light bar 300. The monitor 220 comprises a load unit 240, where a resistance value of the load unit 240 can be adjusted, and the load unit 240 is connected in series between an output end of the detection unit 213 and the ground terminal of the LED backlight driving circuit.

The load unit 240 comprises a first resistor R1 and a second resistor R2 that are connected in series with each other. Two ends of the second resistor R2 is connected with a second controllable switch Q2, namely the second resistor R2 is connected with the second controllable switch Q2 in parallel. The monitor 220 further comprises a second controller 232, where the second controller 232 controls the second controllable switch Q2 to turn off when the display image is switched between the 2D display mode and the 3D display mode.

The load unit 240 is connected in series with the LED light 300. According to voltage-resistor principles, when a total voltage is constant, the resistance value of the load unit 240 increases, and voltage of two ends of the LED light bar 300 according reduces, namely the brightness of the LED light bar 300 reduces. When the second controllable switch Q2 turns on, current flowing through the first resistor R1 and the second controllable switch Q2 flows to the ground terminal of the LED backlight driving circuit without flowing through the second resistor R2. At this time, the resistance value of the load unit 240 is equal to a resistance value of the first resistor R1. The monitor 220 controls the second controllable switch Q2 to turn off when the display image is switched between the 2D display mode and the 3D display mode, the resistance value of the load unit 240 is equal to a sum of the resistance value of the first resistor R1 and the resistance value of the second resistor R2. Namely when the display image is switched between the 2D display mode and the 3D display mode, the resistance value of the load unit 240 increases, which reduces the brightness of the LED light bar 300. Thus, the users do not easily perceive the abnormal display of the LC panel when the display image is switched between the 2D display mode and the 3D display mode.

EXAMPLE 4

As shown in FIG. 3, the LED backlight driving circuit of a fourth example comprises the LED light bar 300, the power supply 100 that drives the LED light bar 300, and the control assembly 200 that controls the LED light bar 300 and the power supply 100. The control assembly 200 is configured with the monitor 220, where the monitor 220 is used for reducing the brightness of the LED light bar 300 when the display image is switched between the 2D display mode and the 3D display mode, and the brightness of the LED light bar 300 gets normal after the preset delay time.

The control assembly 200 comprises the constant current driving chip 210, where the constant current driving chip 210 comprises the detection unit 213. The input end of the detection unit 213 is coupled to the cathode of the LED light bar 300. The monitor 220 comprises the load unit 240, where the resistance value of the load unit 240 can be adjusted, and the load unit 240 is connected in series between the output end of the detection unit 213 and the ground terminal of the LED backlight driving circuit.

The load unit 240 comprises the first resistor R1 and the second resistor R2 that are connected in series with each other. Two ends of the second resistor R2 is connected with the second controllable switch Q2, namely the second resistor R2 is connected with the second controllable switch Q2 in parallel. The monitor 220 further comprises the second controller 232 and a second comparator OP2. A first input end of the second comparator OP2 receives a second reference voltage VF2, and a second input end of the second comparator OP2 is coupled to the second controller 232. The second controller 232 controls the second comparator OP2 to drive the second controllable switch Q2 to turn off when the display image is switched between the 2D display mode and the 3D display mode.

The load unit 240 is connected in series with the LED light bar 300. According to the voltage-resistance principles, when the total voltage is constant, the resistance value of the load unit 240 increases, and the voltage of two ends of the LED light bar 300 accordingly reduces, namely the brightness of the LED light bar 300 reduces. When the second controllable switch Q2 turns on, the current flowing through the first resistor R1 and the second controllable switch Q2 flows to the ground terminal of the LED backlight driving circuit without flowing through the second resistor R2. At this time, the resistance value of the load unit 240 is equal to the resistance value of the first resistor R1. The monitor 220 controls the second controllable switch Q2 to turn off when the display image is switched between the 2D display mode and the 3D display anode, the resistance value of the load unit 240 is equal to the sum of the resistance value of the first resistor R1 and the resistance value of the second resistor R2. Namely when the display image is switched between the 2D display mode and the 3D display mode, the resistance value of the load unit 240 increases, which reduces the brightness of the LED light 300. Thus, the users do not easily perceive abnormal display of the LC panel when the display image is switched between the 2D display mode and the 3D display mode. Additionally, the fourth example uses the second comparator OP2, as long as a driving voltage of the second controller 232 reaches the threshold value, logic of the second comparator OP2 changes. Thus, even if a control signal of the second controller 232 is disturbed, action logic of the second controllable unit Q2 is not directly affected, which improves reliability.

EXAMPLE 5

Figure 6:
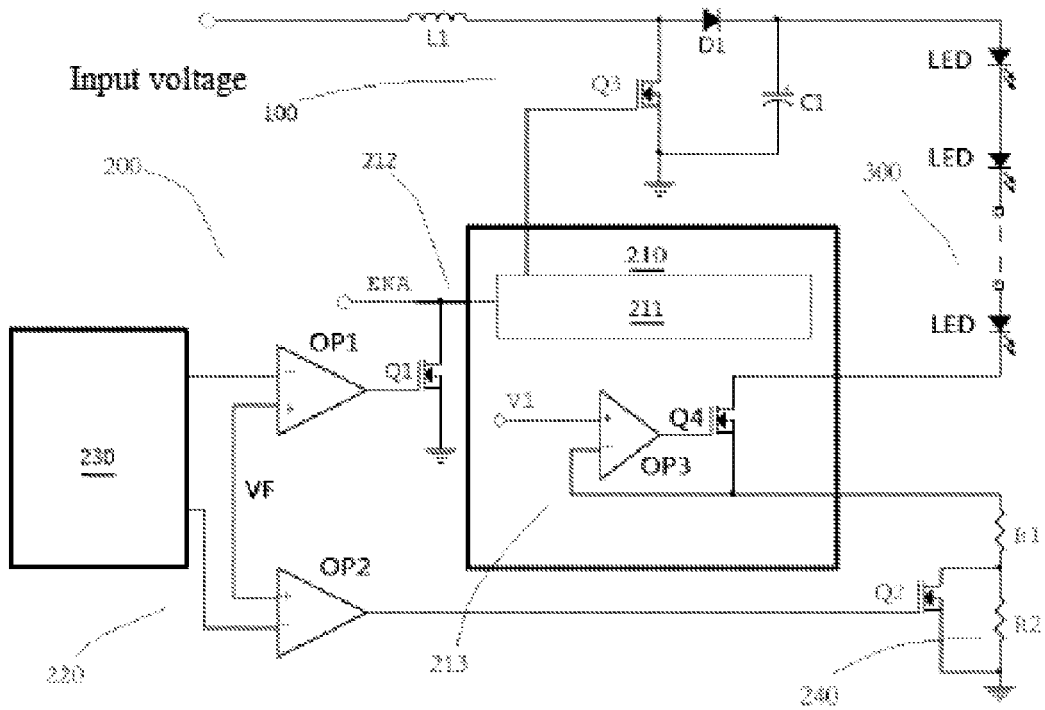
FIG. 6 is a schematic diagram of an LED backlight driving circuit of a fifth example of the present disclosure.

As shown in FIG. 6, the LED backlight driving circuit of a fifth example comprises the LED light bar 300, the power supply 100 that drives the LED light bar 300, and the control assembly 200 that controls the LED light bar 300 and the power supply 100. The control assembly 200 is configured with the monitor 220, where the monitor 220 is used for reducing the brightness of the LED light bar 300 when the display image is switched between the 2D display mode and the 3D display mode, and the brightness of the LED light bar 300 goes normal after the present delay time.

The control assembly 200 comprises the constant current driving chip 210, where the constant current driving chip 210 comprises the detection unit 213 and the main-control unit 211 that controls the power supply 100. The main-control unit 211 comprises the enable control pin 212 that controls the power supply 100 to turn on/off.

The monitor 220 comprises the load unit 240, the first controllable switch Q1, the second controllable switch Q2, the first comparator OP1, the second comparator OP2, and the controller 230. The first controllable switch Q1 is connected in series between the enable control pin 212 and the ground terminal of the LED backlight driving circuit. The first input end of the first comparator OP1 receives the reference voltage VF, and the second input end of the first comparator OP1 is coupled to the controller 230.

The load unit 240 is connected in series between the output end of the detection unit 213 and the ground terminal of the LED backlight driving circuit. The input end of the detection unit 213 is coupled to the cathode of the LED light bar 300. The first input end of the second comparator OP2 receives the reference voltage VF, and the second input end of the second comparator OP2 is coupled to the controller 230. The load unit 240 comprises the first resistor R1 and the second resistor R2 that are connected in series with each other. Two ends of the second resistor R2 is connected with the second controllable switch Q2, namely the second resistor R2 is connected with the second controllable switch Q2 in parallel.

When the display image is switched between the 2D display mode and 3D display mode, the controller 230 controls the first comparator OP1 to drive the first controllable switch Q1 to turn on, or the controller 230 controls the second comparator OP2 to drive the second controllable switch Q2 to turn off.

When the display image is switched between the 2D display mode and the 3D display mode, the fifth example may choose to reduce the brightness of the LED light bar 300 or choose to turn off the LED light bar 300. Additionally, the fifth example use the first comparator OP1 and the second comparator OP2, as long as the driving voltage of the controller 230 reaches the threshold value, logic of the first comparator OP1 or the second comparator OP2 changes. Thus, even if a control signal of the controller 230 is disturbed, the action logic of the first controllable unit Q1 or the second controllable unit Q2 is not directly affected, which improves reliability.

EXAMPLE 6

Figure 7:
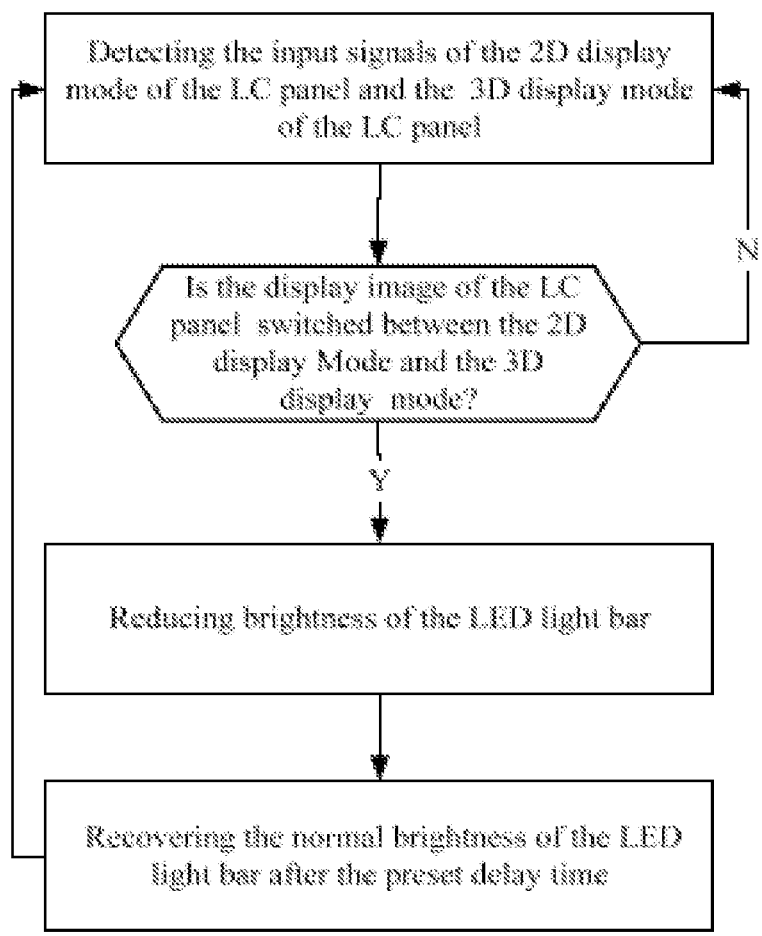
FIG. 7 is a flowchart of a method for driving an LED backlight driving circuit of a sixth example of the present disclosure.

As shown in FIG. 7, a sixth example provides a method for driving the LED backlight driving circuit, comprising:

A: detecting input signals of the 2D display mode of the LC panel and the 3D display mode of the LC panel; and B: reducing the brightness of the LED light bar when the display image of the LC panel is switched between the 2D display mode and the 3D display mode, and changing the brightness of the LED light bar to be normal after the preset delay time.

The LED backlight driving circuit of the LCD device comprises a timing control chip, display data are sent to the timing control chip, and the timing control chip controls a sequence of driving the LC panel and the backlight. Thus, the above-mentioned examples may detect the input signals of the 2D display mode and the 3D display mode by the timing control chip, and controls the brightness of the LED light bar. Namely, functions of the controller, the first controller, and the second controller can be obtained by the timing control chip without changing original circuit structure, which reduces development cost and component cost.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A light emitting diode (LED) backlight driving circuit, comprising:
   an LED light bar;
   a power supply that drives the LED light bar; and
   a control assembly that controls the LED light bar and the power supply;
   wherein the control assembly is configured with a monitor that reduces brightness of the LED light bar when a display image of a liquid crystal (LC) panel is switched between a two-dimensional (2D) display mode of the LC panel and a three-dimensional (3D) display mode of the LC panel, and the brightness of the LED light bar goes normal after a preset delay time.

2. The LED backlight driving circuit of claim 1, wherein the control assembly comprises a constant current driving chip; the constant current driving chip comprises a main-control unit that controls the power supply, the main-control unit comprises an enable control pin that controls the power supply to turn on/off, a signal turning off the constant current driving chip is sent to the enable control pin by the monitor when the display image is switched between the 2D display mode and the 3D display mode.

3. The LED backlight driving circuit of claim 2, wherein the monitor comprises a first controllable switch, and a first controller that controls the first controllable switch; the first controllable switch is connected in series between the enable control pin and a ground terminal of the LED backlight driving circuit, and the first controller controls the first controllable switch to turn on when the display image is switched between the 2D display mode and the 3D display mode.

4. The LED backlight driving circuit of claim 2, wherein the monitor comprises a first controllable switch, a first comparator, and a first controller; a first input end of the first comparator receives a first reference voltage, and a second input end of the first comparator is coupled to the first controller; the first controller controls the first comparator to drive the first controllable switch to turn on when the display image as switched between the 2D display mode and the 3D display mode.

5. The LED backlight driving circuit of claim 1, wherein the control assembly comprises a constant current driving chip; the constant current driving chip comprises a detection unit, an input end of the detection unit is coupled to a cathode of the LED light bar; the monitor comprises a load unit, a resistance value of the load unit is adjustable, and the load unit is connected in series between an output end of the detection unit and a ground terminal of the LED backlight driving circuit; the monitor controls the resistance value of the load unit to increase when the display image is switched between the 2D display mode and the 3D display mode.

6. The LED backlight driving circuit of claim 5, wherein the load unit comprises a first resistor and a second resistor that are connected in series with each other; two ends of the second resistor is connected with a second controllable switch, and the second resistor is connected with the second controllable switch in parallel; the monitor further comprises a second controller, and the second controller controls the second controllable switch to turn off when the display image is switched between the 2D display mode and the 3D display mode.

7. The LED backlight driving circuit of claim 5, wherein the load unit comprises a first resistor and a second resistor that are connected in series with each other; two ends of the second resistor is connected with a second controllable switch, and the second resistor is connected with the second controllable switch in parallel; the monitor further comprises a second controller and a second comparator; a first input end of the second comparator receives a second reference voltage, and a second input end of the second comparator is coupled to the second controller; the second controller controls the second comparator to drive the second controllable switch to turn off when the display image is switched between the 2D display mode and the 3D display mode.

8. The LED backlight driving circuit of claim 1, wherein the control assembly comprises a constant current driving chip; the constant current driving chip comprises a detection unit and a main-control unit that controls the power supply, and the main-control unit comprises an enable control pin that controls the power supply to turn on/off;
  the monitor comprises a load unit, a first controllable switch, a second controllable switch, a first comparator, a second comparator, and a controller; the first controllable switch is connected in series between the enable control pin and a ground terminal of the LED backlight driving circuit;
  a first input end of the first comparator receives a reference voltage, and a second input end of the first comparator is coupled to the controller; the load unit is connected in series between an output end of the detection unit and the ground terminal of the LED backlight driving circuit; an input end of the detection unit is coupled to a cathode of the LED light bar; a first input end of the second comparator receives, the reference voltage, and a second input end of the second comparator is coupled to the controller; the load unit comprises a first resistor and a second resistor that are connected in series with each other; two ends of the second resistor is connected with the second controllable switch, and the second resistor is connected with the second controllable switch in parallel;
  when the display image is switched between the 2D display mode and the 3D display mode, the controller controls the first comparator to drive the first controllable switch to turn on, or the controller controls the second comparator to drive the second controllable switch to turn off.

9. A light crystal display (LCD) device, comprising:
  a light emitting diode (LED) backlight driving circuit;
  wherein the LED backlight driving circuit comprises an LED light bar, a power supply that drives the LED light bar, and a control assembly that controls the LED light bar and the power supply;
  the control assembly is configured with a monitor that reduces brightness of the LED light bar when a display image of a liquid crystal (LC) panel is switched between a two-dimensional (2D) display mode and a three-dimensional (3D) display mode, and the brightness of the LED light bar goes normal after a preset delay time.

10. The LCD device of claim 9, the control assembly comprises a constant current driving chip, and the constant current driving chip comprises a main-control unit that controls the power supply; the main-control unit comprises an enable control pin that controls the power supply to turn on/off, a signal turning off the constant current driving chip is sent to the enable control pin by the monitor when the display image is switched between the 2D display mode and the 3D display mode.

11. The LCD device of claim 10, wherein the monitor comprises a first controllable switch and a first controller that controls the first controllable switch; the first controllable switch is connected in series between the enable control pin and a ground terminal of the LED backlight driving circuit, and the first controller controls the first controllable switch to turn on when the display image is switched between the 2D display mode and the 3D display mode.

12. The LCD device of claim 10, wherein the monitor comprises a first controllable switch, a first comparator, and a first controller; a first input end of the first comparator receives a first reference voltage, and a second input end of the first comparator is coupled to the first controller; the first controller controls the first comparator to drive the first controllable switch to turn on when the display image is switched between the 2D display mode and the 3D display mode.

13. The LCD device of claim 9, wherein the control assembly comprises a constant current driving chip; the constant current driving chip comprises a detection unit, and an input end of the detection unit is coupled to a cathode of the LED light bar; the monitor comprises a load unit, a resistance value of the load unit is adjustable, and the load unit is connected in series between an output end of the detection unit and a ground terminal of the LED backlight driving circuit; the monitor controls the resistance value of the load unit to increase when the display image is switched between the 2D display mode and the 3D display mode.

14. The LCD device of claim 13, wherein the load unit comprises a first resistor and a second resistor that are connected in series with each other; two ends of the second resistor is connected with a second controllable switch, and the second resistor is connected with the second controllable switch in parallel; the monitor further comprises a second controller, and the second controller controls the second controllable switch to turn off when the display image is switched between the 2D display mode and the 3D display mode.

15. The LCD device of claim 13, wherein the load unit comprises a first resistor and a second resistor that are connected in series with each other, two ends of the second resistor is connected with a second controllable switch, and the second resistor is connected with the second controllable switch in parallel; the monitor further comprises a second controller and a second comparator; a first input end of the second comparator receives a second reference voltage, and a second input end of the second comparator is coupled to the second controller; the second controller controls the second comparator to drive the second controllable switch to turn off when the display image is switched between the 2D display mode and the 3D display mode.

16. The LCD device of claim 9, wherein the control assembly comprises a constant current driving chip; the constant current driving chip comprises a detection unit and a main-control unit that controls the power supply, and the main-control unit comprises an enable control pin that controls the power supply to turn on on/off;
  the monitor comprises a load unit, a first controllable switch, a second controllable switch, a first comparator, a second comparator, and a controller; the first controllable switch is connected in series between the enable control pin and a ground terminal of the LED backlight driving circuit;

a first input end of the first comparator receives a reference voltage, and a second input end of the first comparator is coupled to the controller; the load unit is connected in series between an output end of the detection unit and the ground terminal of the LED backlight driving circuit; an input end of the detection unit is coupled to a cathode of the LED light bar; a first input end of the second comparator receives the reference voltage, and a second input end of the second comparator is coupled to the controller; the load unit comprises a first resistor and a second resistor that are connected in series with each other; two ends of the second resistor is connected with the second controllable switch, and the second resistor is connected with the second controllable switch in parallel;

when the display image is switched between the 2D display mode and the 3D display mode, the controller controls the first comparator to drive the first controllable switch to turn on, or the controller controls the second comparator to drive the second controllable switch to turn off.

17. A method for driving a light emitting diode (LED) backlight driving circuit, comprising:

A: detecting input signals of a two-dimensional (2D) display mode of a liquid crystal (LC) panel and a three-dimensional (3D) display mode of the LC panel; and B: reducing brightness of an LED light bar when a display image of the LC panel is switched between the 2D display mode and the 3D display mode, and changing the brightness of the LED light bar to be normal after a preset delay time.

* * * * *